(12) United States Patent
Liang et al.

(10) Patent No.: US 6,996,707 B2
(45) Date of Patent: *Feb. 7, 2006

(54) METHOD, SYSTEM, AND ARTICLE OF MANUFACTURE FOR LIMITING ACCESS TO PROGRAM FILES IN A SHARED LIBRARY FILE

(75) Inventors: Sheng Liang, Mountain View, CA (US); David W. Connelly, San Francisco, CA (US); Benjamin Renaud, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 10/139,328

(22) Filed: May 7, 2002

(65) Prior Publication Data

US 2002/0169791 A1 Nov. 14, 2002

Related U.S. Application Data

(63) Continuation of application No. 09/492,120, filed on Jan. 27, 2000, now Pat. No. 6,385,722.

(51) Int. Cl.
*G06F 9/24* (2006.01)
*G06F 12/14* (2006.01)

(52) U.S. Cl. .......................................... 713/2; 713/200
(58) Field of Classification Search .................... 713/2, 713/200; 717/120, 122; 707/1, 9
See application file for complete search history.

(56) References Cited

U.S. PATENT DOCUMENTS

| 4,638,298 A | 1/1987 | Spiro |
| 5,359,721 A | 10/1994 | Kempf et al. |
| 5,615,400 A | 3/1997 | Cowsar et al. |
| 5,727,147 A | 3/1998 | van Hoff |
| 5,758,153 A | * 5/1998 | Atsatt et al. ............. 707/103 R |
| 5,987,242 A | 11/1999 | Bentley et al. |
| 5,987,608 A | 11/1999 | Roskind |
| 6,134,594 A | * 10/2000 | Helland et al. ............. 709/229 |
| 6,385,722 B1 | * 5/2002 | Connelly et al. ............. 713/2 |

FOREIGN PATENT DOCUMENTS

WO  WO 99/57634  11/1999

OTHER PUBLICATIONS

PTO Office Action mailed Aug. 16, 2004 in corresponding U.S. Appl. No. 10/455,341.
Wallach, D.S. et al, "Extensible Security Architectures for JAVA", Operating Systems Review (SIGOPS), ACM Headquarters, New York, vol. 31, No. 5.

* cited by examiner

*Primary Examiner*—Dennis M. Butler
(74) *Attorney, Agent, or Firm*—Finnegan Henderson Farabow Garrett & Dunner LLP

(57) ABSTRACT

Methods, systems, and articles of manufacture consistent with the present invention limit access to parts of a shared software library by using a class loader that generates a selective interface between an external process and a program file (such as a class definition) in the shared library. This prevents external processes from loading parts of the shared library that were meant to remain private or internal to the library. Methods, systems, and articles of manufacture consistent with the present invention load a program file, such as a class definition, from the shared library and generate an interface (such as an object) to the loaded program file. A determination of whether the program file can be exported is performed based upon a status indicator associated with the interface. The interface limits access to the program file if it is determined that the program file cannot be exported.

68 Claims, 3 Drawing Sheets

METHOD, SYSTEM, AND ARTICLE OF MANUFACTURE FOR LIMITING ACCESS TO PROGRAM FILES IN A SHARED LIBRARY FILE

This is a continuation of application Ser. No. 09/492,120, filed Jan. 27, 2000 now U.S. Pat. No. 6,385,722, which is incorporated herein by reference.

BACKGROUND OF THE INVENTION

A. Field of the Invention

This invention relates to systems for limiting access to parts of shared software libraries and, more particularly, to systems for limiting access to object class definition files within shared libraries using class loaders.

B. Description of the Related Art

Software vendors typically ship their products as a set of shared libraries, such as libraries written in the Java™ object-oriented programming language and packaged as a conventional shared library file called a JAR file. In this manner, program files stored within these libraries can be easily and efficiently shared and used by any program module that is part of the vendor's product.

Shared libraries are often used to maintain class definitions when the vendor's product is written using object-oriented programming. In an object-oriented programming environment, an object generally encapsulates data members and function members (or methods) that manipulate the data member. An object is an instance of a class, which defines various data members and methods shared by objects of the same class. Thus, shared libraries can be used to define each type of object used in the vendor's product.

It is important that a user be able to access the parts of shared libraries that are meant to be shared. This is how its contents (generally referred to as program files) are meant to be used in such a library implementation. However, not all of the contents are meant to be used externally to the shared library. There are class definitions and objects that can be accessed by any code that uses the shared library, even though these class definitions and objects are meant to be only used internally in the library implementation. As a result, one of the problems faced by software vendors using shared libraries is limiting access to those parts of shared libraries that are not meant to be shared externally to the library implementation. For example, in a Java™ library packaged into a JAR file, a package is declared to be public and can then be accessed by any code that uses the Java™ library despite the fact that the Java™ package is meant to be only used internally to the library.

Aside from the basic problem of providing an external process with unauthorized access to these parts of the shared library, other problems may occur as a result of doing so. For example, namespace problems may occur when externally using parts of a shared library that are supposed to be only used internal to the library. The software vendor that created the shared library may use specific names or a naming convention for parts of the shared library without regard to namespace collisions external to the shared library. However, when an external process accesses a package meant to be strictly internal to the library, the name for the package may conflict with the name of another package or object already used by the external process. In such a situation, there may be a duplication of class definitions for a given package name leading to problems on how to resolve what functionality is associated with the named packages or objects.

The introduction of sealing in the Java™ programming language has improved the situation by allowing some instances of this problem to be detected and an error raised. However, simply raising an error at run-time and requiring the end user to take appropriate action to fix the problem is not as desirable as having the program work as intended. Also, sealing will not generally help in the important case of wanting to ship an application or applet bundled with a particular version of some extension. If some different version of that extension is already installed on an end user's computer, the installed one takes precedence over the bundled one.

Accordingly, there is a need for a system that permits access to certain parts of a shared library while limiting access to other parts of the shared library.

SUMMARY OF THE INVENTION

Methods, systems, and articles of manufacture consistent with the present invention overcome the shortcomings of existing systems by using a class loader to limit access to parts of a shared library, such as a JAR file. The class loader generates an interface between external processes seeking to access a program file in the library and the files in the library itself. Methods, systems, and articles of manufacture consistent with the present invention, as embodied and broadly described herein, load a program file from a shared software library. Typically the program file is a class definition loaded by a class loader. Next, an interface to the loaded program file is generated. The interface, preferably an interface object, has a status indicator as to whether the program file can be exported. The status indicator, preferably determined by executing a status method that is part of the preferred interface object, is used to determine if the program file can be exported from the shared library. The status method is typically created by reading an attribute within the shared library that indicates if the program file can be exported. If the program file cannot be exported based on the status indicator, access to the program file is limited. On the other hand, if the status indicator shows the program file can be exported, the program file is returned to a requesting process.

In accordance with another aspect of the present invention, methods, systems, and articles of manufacture, as embodied and broadly described herein, describe a system for limiting access to an object class definition in a shared library. The system has a memory storage device that maintains the shared library and a class loader. The system also includes a processor coupled to the memory storage device. The processor is operative to load the object class definition from the shared library on the memory storage device using the class loader. Once the appropriate object class definition has been located within the shared library and loaded, the processor is further operative to create an instance of an interface object in the memory storage device typically by calling a package method within the class loader. The interface object is associated with the object class definition and includes a status method created by the processor as part of the interface object in the memory storage device. The status method defines a function that designates if the object class definition is accessible by an external process running on the processor. The processor is also operative to call the status method to determine if the object class definition is designated to be accessible to the external process. Finally, the processor is capable of limiting access to the object class definition if the executed status method indicates the object class definition is not designated to be accessible to the external process.

In accordance with yet another aspect of the present invention, methods, systems, and articles of manufacture, as embodied and broadly described herein, describe a computer-readable medium, which contains instructions for limiting access to an object class definition within a shared software library. When the instructions are executed, the object class definition is loaded from the shared software library using a class loader. Next, an instance of an interface object associated with the object class definition is created by the class loader along with a status method related to the interface object. Typically, another method within the class loader is called to created the instance of the interface object. The status method indicates if the object class definition is designated to be accessible by an external process. The status method is called to determine if the object class definition is designated to be accessible to the external process. Finally, access to the object class definition is limited or denied if the status method indicates the object class definition is not designated to be accessible to the external process.

BRIEF DESCRIPTION OF THE DRAWINGS

The accompanying drawings, which are incorporated in and constitute a part of this specification, illustrate an implementation of the invention. The drawings and the description serve to explain the advantages and principles of the invention. In the drawings.

DETAILED DESCRIPTION

Reference will now be made in detail to an implementation consistent with the present invention as illustrated in the accompanying drawings. Wherever possible, the same reference numbers will be used throughout the drawings and the following description to refer to the same or like parts.
Introduction In general, methods and systems consistent with the present invention process a call during execution of a process, such as an applet written in the Java™ programming language, by using a class loader to limit which parts of a shared library can be accessed by external processes. By doing so, parts of the shared library that are meant to be limited to internal use cannot be accessed and used by external processes.

In more detail, a request for a program file (such as a class definition) is received by a class loader from an executing process (such as an applet) external to a shared library. In response to receiving the request, the class loader loads the appropriate program file from the shared library and generates an interface (such as an interface object) to the loaded program file. The interface has a status indicator (such as a status method), which provides an indication of whether the program file can be exported to the external process. Based upon the value of the status indicator, access to the loaded program file is limited via the generated interface to the program file. If access to the program file is limited, the executing process is denied access to the program file. Otherwise, the executing process receives access to the program file via the interface. Thus, a class loader is utilized to not only load the correct and appropriate class definition but to also provide the ability to limit access to those parts of a shared library that are meant to be only internally accessed.

Computer Architecture

Figure 1:
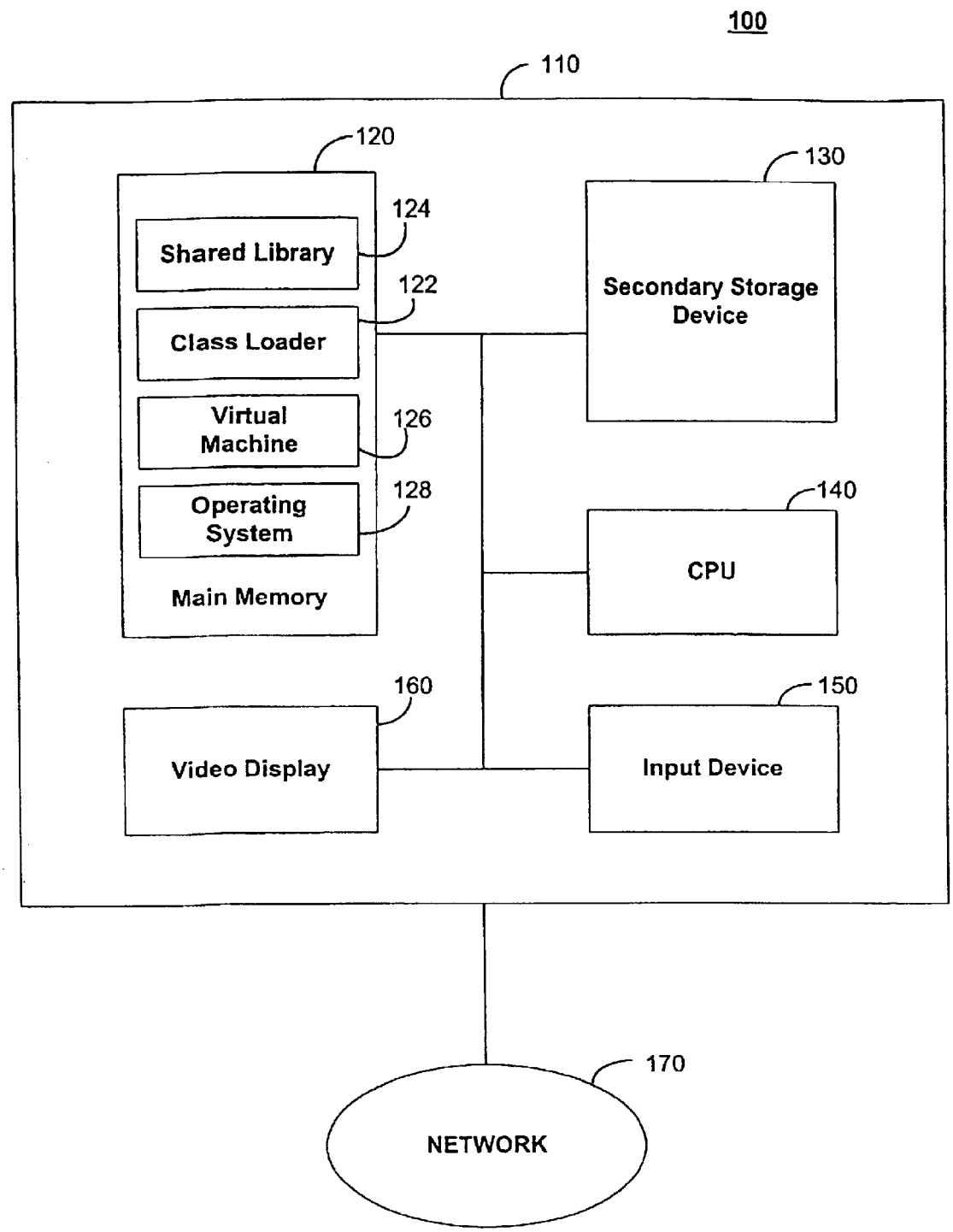
FIG. 1 is a block diagram of a data processing system suitable for use with methods and systems consistent with the present invention.

FIG. 1 depicts an exemplary data processing system 100 suitable for practicing methods and implementing systems consistent with the present invention. Referring now to FIG. 1, data processing system 100 includes a computer system 110 connected to a network 170, such as a Local Area Network, Wide Area Network, or the Internet.

Computer system 110 contains a memory storage device called main memory 120, a secondary memory storage device 130, a central processing unit (CPU) 140, an input device 150, and a video display 160, each of which are electronically coupled to the other parts of computer system 110. In an exemplary embodiment consistent with the present invention, computer system 110 is implemented using a SPARC™ computer architecture. Further details regarding the SPARC™ computer architecture can be found in a number of texts, including the SPARC™ V9 Reference Manuals available from SPARC International of Menlo Park, Calif., which are hereby incorporated by reference.

In computer system 110, main memory 120 contains an operating system 128, a virtual machine (VM) 126, a class loader 122, and a shared library 124. An exemplary VM 126 for purposes of this description is a Java™ Virtual Machine (JVM), which is part of the Java™ runtime environment included in the Java™ software development kit (JDK). The JDK is available from Sun Microsystems of Palo Alto, Calif. In general, the JVM acts like an abstract computing machine, receiving instructions from programs (such as applets) in the form of bytecodes. A bytecode is essentially a compiled format for a general purpose program, such as a program written in the Java™ programming language. Once the instructions or bytecodes have been received, the JVM interprets these bytecodes by dynamically converting them into a form for execution, such as object code, and executing them.

This execution scheme for program modules, such as applets written in the Java™ programming language, facilitates the platform independent nature of the JVM. Further details on the JVM can be found in a number of texts, including Lindholm and Yellin, *The Java Virtual Machine Specification*, Addison-Wesley, 1997, which is hereby incorporated by reference.

During execution of a program module, VM 126 may encounter a symbolic reference to an object class that has yet to be loaded. In such a situation, VM 126 typically delegates the task of loading the appropriate program files to a class loader.

Class loaders are known in the art and are normally used when an interpreter requires an object class definition that is not yet been loaded. Basically, the class loader loads object class definitions from particular memory storage locations (remote servers or local memory files) where the object class definitions are maintained. A more detailed description of a conventional class loader is illustrated in U.S. Pat. No. 5,727,147 entitled "SYSTEM AND METHOD FOR RESOLVING SYMBOLIC REFERENCES TO EXTERNALLY LOCATED PROGRAM FILES", which is assigned to Sun Microsystems of Mountain View, Calif. and is hereby incorporated by reference.

Exemplary class loader 122 is a conventional class loader with the addition of several other features enabling it to operate as a selective interfacing mechanism to parts of a shared library, such as shared library 124. In particular, class loader 122 can create an interface to program files in shared library 124. The interface also has a status indicator that determines if those program files are to be exported or accessible to external processes. This ability to load the appropriate class definition from the correct location and to operate as an interface allows class loader 122 to limit access to specific program files, such as object class definitions, within a shared library.

For example, an external process (such as an applet running in conjunction with VM 126) needs to load a particular class definition because that class definition is not yet loaded into main memory 120. If that class definition is meant to be exported to external processes, then simply loading the class definition would suffice. However, if that class definition is not meant to be accessible by external processes, further steps are required to limit access to the class definition. Class loader 122 receives the request and loads the requested class definition from within shared library 124. In this example, library 124 is implemented as a conventional JAR file that maintains definitions for many classes of Java™ packages or objects. At this point, class loader 122 creates an interface object, also called a package object, that encapsulates the requested class definition and includes a status method as the status indicator. If the requested class definition is designated to be externally accessible, the result of executing the status method is a preselected value, such as "true." A more detailed description is available below with regard to FIG. 2.

Additionally, one skilled in the art will appreciate that although one implementation consistent with the present invention is described as being practiced in conjunction with a JVM, systems and methods consistent with the present invention may also be practiced in an environment other than a Java™ environment. For example, the request for a program file (such as a class definition) within the shared library may come from a multi-threaded application program module (not shown) running in conjunction with operating system 128 without the need for VM126.

Furthermore, one skilled in the art will appreciate that all or part of systems and methods consistent with the present invention may be stored on or read from other computer-readable media, such as secondary storage devices, like hard disks, floppy disks, and CD-ROM; a carrier wave received from the Internet; or other forms of ROM or RAM. Finally, although specific components of data processing system 100 have been described, one skilled in the art will appreciate that a data processing system suitable for use with the exemplary embodiment may contain additional or different components, such as multiple processors and a variety of input/output devices.

Access Limiting System

Figure 2:
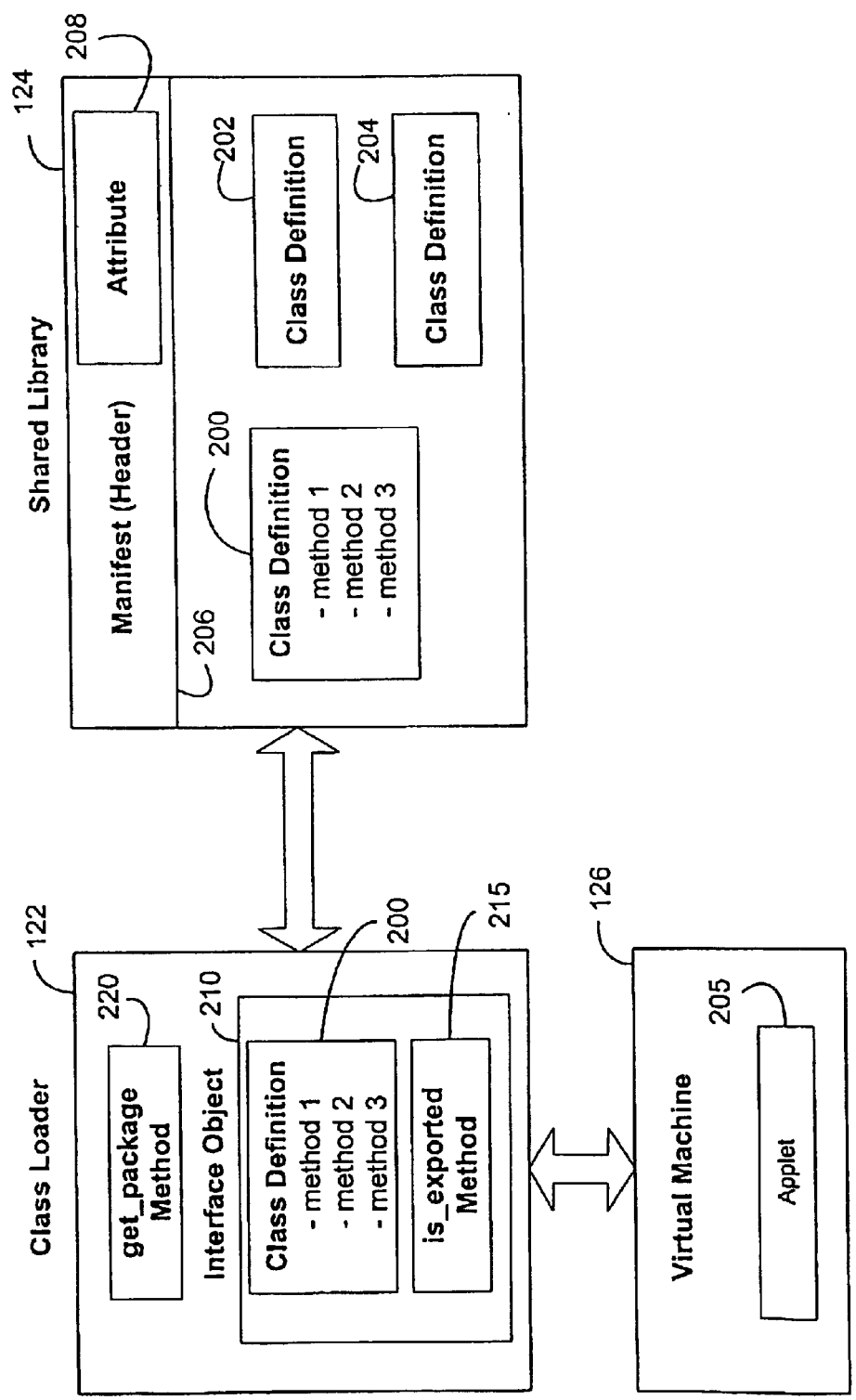
FIG. 2 is a block diagram illustrating how a class loader can be used to limit access to files within a shared library consistent with an exemplary embodiment of the present invention.

FIG. 2 is a more detailed block diagram illustrating how an exemplary class loader can be used to limit access to files within an exemplary shared library consistent with an embodiment of the present invention. Referring now to FIGS. 1 and 2, VM 126, class loader 122 and shared library 124 are illustrated as blocks of software that interact together. Within VM 126 is an applet 205 containing instructions or bytecodes that are interpreted and executed by VM 126. During execution of a bytecode from applet 205, VM 126 may need to load a particular object class definition because the bytecode lists an object defined by that particular object class, which has not yet been loaded into main memory 120 from shared library 124. To load the object class definition that is appropriate for the bytecode, VM 126 uses or delegates to class loader 122 to find the correct object class definition. In this way, class loader 122 receives a request from VM 126 for the object class definition.

In response to the request, class loader 122 determines the appropriate object class definition to load. In the exemplary embodiment illustrated in FIG. 2, the appropriate object class definition is located in shared library 124, which maintains numerous program files, such as class definitions 200, 202, and 204. In the example illustrated in FIG. 2, class loader 122 determines that class definition 200 is the appropriate definition and retrieves the object class definition from shared library 124. So far, this is typically what is done by most conventional class loaders.

In addition to the standard class loading functionality described above, class loader 122 includes a method that creates an interface to the object class definition. In the exemplary embodiment, the method 220 is called get_package. When the get_package method 220 is called, it creates an instance of an object 210 (called an interface object or package object) that encapsulates the object class definition 200. The get_package method 220 also creates a method 215 (generally referred to as a status method) as part of interface object 210 that indicates if the object class definition is designated to be accessible to an external process. Typically, method 220 within class loader 122 looks within shared library 124 for an indicator or other kind of flag type mechanism that indicates whether the desired object class definition can be exported. In the exemplary embodiment, the get_package method 220 reads an attribute 208 in the manifest or header 206 of shared library 124. The manifest 206 keeps information about the contents (i.e., the program files) in shared library 124. As part of manifest 206, attribute 208 is preferably a list of which files in shared library 124 are designated to be exported or accessible to external processes.

Based upon attribute 208, get_package method 220 defines the status method 215 in interface object 210 to provide or return the appropriate value when executed. For example, if object class definition 200 is not to be accessible by external processes, status method 215 (called "is_exported" in the exemplary embodiment) returns a "false" value when called. In this manner, class loader 122 finds and loads the correct program file (such as object class definition 200) but does not return it to the requesting process (such as applet 205) if a status indicator (such as the result of executing status method 215) indicates the program file is not to be exported.

In a more detailed embodiment where the shared library 124 is a JAR file, the JAR file has the capability to declare one or more of its packages to be exported. Classes and resources contained in exported packages are visible to other JAR files. Packages which are not exported are called private, and their classes and resources are only visible within that JAR file. Also, private classes and resources are locally scoped, meaning that when a class/resource name has to be resolved in code from this JAR file, the definitions in the JAR file take precedence over any other classes/resources of the same names that may be visible.

In this detailed embodiment, exported packages are declared through the new per-entry manifest attribute 208, such as Exported: (true|false). This boolean attribute indicates whether or not a specific package should be exported. For example, in the following manifest entry:

Name: javax/foo/

Exported: true the package javax.foo would be exported.

This attribute can be applied to individual classes or resource files, as well as to packages and directories. In this embodiment, when a package or directory is exported, all of the classes/resources that it contains are automatically exported unless they are explicitly made private by having their own Exported: false attribute. However, if the package/directory contains subpackages/subdirectories, they are usually not automatically exported.

In an exemplary embodiment, the default is typically for all packages/directories and classes/resources to be exported if there are no Exported attributes specified. If there is at least one Exported attribute specified, the default is that everything is private unless declared exported.

A JAR tool within the Java™ programming lanugage has a -e option allowing an exports file to be specified. This is convenient for software developers so that they can list the exports concisely rather than have to create the appropriate manifest file. The format of the exports file is preferably a sequence of package names and JAR file entries, each terminated by a new line. For example, specifying the following exports file using the -e option:

foo.bar foo.baz

/images/foo.gif

/foo.properties would be equivalent to specifying the following manifest file with the conventional -m option:

Name: foo/bar

Exported: true

Name: foo/baz

Exported: true

Name: images/foo.gif

Exported: true

Name: foo.properties

Exported: true

The -e and -m options can be used together in which case the manifests are merged. In merging manifests, the Exported attributes generated from the -e option take precedence; i.e. any other Exported attributes from other manifests are ignored, so that the exports file always lists the complete set of exports.

In an exemplary embodiment, the class java.net.URL-ClassLoader is used as class loader 122 to load classes and resources from a class path of JAR files and directory URLs. As illustrated in FIG. 2, this embodiment basically involves creating a small class loader to wrap each JAR file on the class path that declares one or more exported packages in its manifest. This class loader, preferably called JarClassLoader will be a private class and its purpose is to allow any code loaded from the shared library 124 (e.g. JAR file) to access its own private classes and resources while keeping them hidden from other JAR files on the class path.

The following is an exemplary implementation of the JarClassLoader written in pseudo-code:

```
import Java.lang.ClassLoader;
import java.net.URL;
class JarClassLoader extends SecureClassLoader {
    JarClassLoader (URL url, ClassLoader parent) {
        .. open jar url ...
    }
    /*
     * Returns the url representing the resource
     * matching the given name which is exported
     * from this jar file.
     */
    public URL getExportedResource (String name) {
        if (isExported (name)) {
            return findResource (name);
        }
    }
    /*
     * Returns the url representing the resource matching
     * the given name. Any resource declared private in this
     * jar file will be only accessible to code loaded from
     * this jar file and will have precedence over other
     * resources in the class path.
     */
    public URL getResource (String name) {
        if (containsEntry (name) && !isExported()) {
            return findResource (name);
        }
        return parent.getResource (name);
    }
    /*
     * Returns an enumeration of urls representing the resources
     * which match the given name. Any resources declared private
     * in this jar file will only be accessible to code loaded from
     * the jar file and will have precedence over other resources
     * in the class path.
     */
    public URL getResources (String name) throws IOException {
        URL u = findResource (name);
        if (u != null && !isExported (name)) {
            Enumeration e = parent.getResources (name);
            return new ResourceEnumeration (u, e);
        } else {
            return parent.getResources (name);
        }
    }
    /*
     * Inner class which adds an object to the front of an
     * Enumeration.
     */
    private class ResourceEnumeration implements Enumeration {
        ResourceEnumeration (Object o0, Enumeration e0) {
            ....
        }
        ...
    }
    /*
     * Returns true if the jar file contains the specified entry.
     */
    private boolean containsEntry (String name) {
        ...
    }
    /*
     * Returns true if the jar file exports the specified class.
     */
    private boolean isExportedClass (String name) {
        String s = name.replace ('.', '/').concat(".class");
        return isExported(s);
    }
    /*
     * Searches the jar file for the specified class name.
     /*
    protected Class findClass (String name) throws
    ClassNotFoundException
    {
        .. load class from jar file ..
    }
    /*
     * First checks loaded classes for the specific class name,
     * then calls findClass () to load the class if the class
     * is declared exported.
     */
    Class loadExportedClass (String name) {
        Class c = findLoadedClass (name);
        if (c == null && isExportedClass(name)) {
            try {
                c = findClass (name);
            } catch (ClassNotFoundException e) {
            }
        }
        return c;
```

-continued

```
}
public Class loadClass (String name) throws ClassNotFoundException
{
    Class c = findLoadedClass (name);
    if (c == null) {
        if (containsEntry (name) && !isExportedClass (name)) {
            c = findClass();
        }
        if (c == null) {
            c = parent.loadClass (name);
        }
    }
    return c;
}
}
```

In the context of the above example pseudocode, URL-ClassLoader will create a new instance of JarClassLoader for each JAR file on the class path that declares one or more exported packages. The delegation parent for JarClassLoader will be the instance of URLClassLoader created for the class path containing the JAR file. Whenever code loaded from the JAR file is linked, the JarClassLoader's loadClass method will be called.

First, findLoadedClass( ) is called to check if the class has already been loaded. Next, if the class is contained in this JAR file but not declared exported, an attempt to load the class from the JAR file occurs. If this fails, the parent URLClassLoader's loadClass( ) method is called to check for a public class. This allows private classes to have local scoping while maintaining ordinary scoping for public classes.

When URLClassLoader checks this JAR file for a class referenced by another JAR file on the class path, it will call JarClassLoader's loadExportedClass method to load the class. This method is similar to loadClass except that it does not check the delegation parent and will only load classes from the JAR file that are declared to be exported. This prevents private classes from being loaded by other JAR files on the class path.

Access Limiting Process

Figure 3:
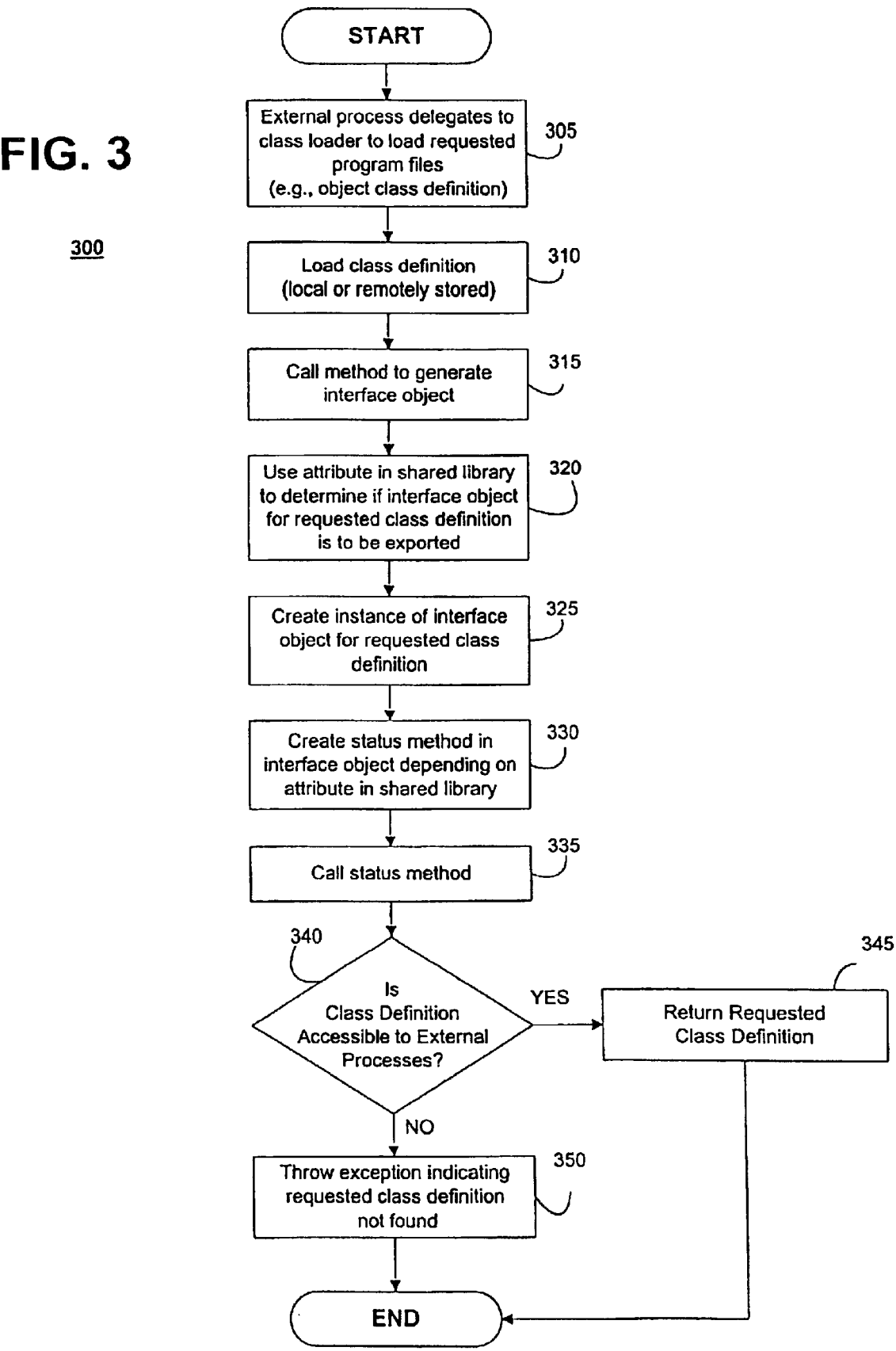
FIG. 3 is a flow chart illustrating typical steps performed by the class loader to limit access to files within a shared library consistent with an exemplary embodiment of the present invention.

Further details on steps of an exemplary method in accordance with the present invention for limiting access to program files, such as object class definitions, in shared libraries using a class loader will now be explained with reference to the flow chart of FIG. 3. Referring now to FIGS. 1–3, the method 300 begins at step 305 where an external process delegates to a class loader to load a requested class definition. In the exemplary embodiment, applet 205 has a bytecode that is interpreted by VM 126, which then calls class loader 122 to load the appropriate object class definition needed to interpret the bytecode.

At step 310, the appropriate class definition is located and loaded. In the exemplary embodiment, class definition 200 is determined by class loader 122 to be the appropriate class definition to retrieve from shared library 124.

At step 315, a method is called to generate an interface to the loaded class definition. In general, the interface can be any type of program interface or programming structure that can selectively provide access to other file or information. In the exemplary embodiment, the get_package method 220 is called to create an instance of interface object 210 as the interface. When the get_package method 220 executes, attribute 208 in shared library 124 is read at step 320 to determine if the interface should allow access to the requested program file in shared library 124, such as class definition 200.

At step 325, an instance of the interface (e.g., interface object 210) is created for class definition 200. As part of creating interface object 210, a status method is created at step 330 depending on attribute 208 in shared library 124. The status method is used to determine if the class definition is designated to be accessible to external processes depending on attribute 208. In the exemplary embodiment, the status method is implemented as is_exported method 215 within interface object 210. When executed, is_exported method 215 generally operates as a status indicator indicating if class definition 200 is accessible to an external process, such as applet 205. Thus, if class definition 200 is supposed to be accessible to external processes, the is_exported method 215 returns an export indicator of "true."

At step 335, the status method is called to determine if the class definition or, more generally stated, the program files encapsulated by interface object 210 can be exported at step 340. If the export indicator indicators the class definition is exportable, then step 340 proceeds to step 345 where the class definition is returned by class loader 122 to the requesting process (e.g., VM 126 interpreting applet 205). Otherwise, step 340 proceeds directly to step 350 where access to the class definition is limited and the class definition is not returned to the requesting process. Instead, class loader 122 throws an exception indicating an error condition of attempting to access an inaccessible file and that the requested class definition was not found.

Conclusion

Methods and systems described above and consistent with the present invention limit access to parts of shared library 124, such as program files or, more specifically, object class definitions. These methods and system use class loader 122 to load an object class definition from shared library 124 and then create an interface, such as interface object 210, to the loaded class definition 200 of shared library 124. As part of the interface, a status method is created depending upon the value of attribute 208 within shared library 124. Calling the status method returns an export indicator that indicates if the class definition encapsulated in the interface is designated to be accessible to an external process, such as applet 205. If the class definition is meant to be used only internal to the shared library and not by external processes, the status method indicates so and class loader 122 limits access to that part of the shared library 124.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. Systems consistent with the present invention are applicable when executing programs written in all computer programming languages, including the Java™ programming language, Smalltalk-80, and C++.

Furthermore, those skilled in the art will appreciate that while the invention is described in terms of object-oriented systems, the invention may be implemented with non-object-oriented programming systems as well. The scope of the invention is defined by the claims and their equivalents.

What is claimed is:

1. A method for limiting access to programs, comprising:
  receiving, from a first external process, a request for a program;

retrieving the requested program from a library; reading an attribute associated with the library and reflecting a list of programs designated as accessible to external processes;

instantiating an interface object that encapsulates the requested program;

determining whether the requested program is to be accessible to the first external process based on the attribute; and sending the requested program to the first external process based on the determination.

2. The method of claim 1, wherein the library is a shared library.

3. The method of claim 1, wherein the first external process is an application program module.

4. The method of claim 1, wherein the first external process is a multi-threaded application program module running in conjunction with an operating system.

5. The method of claim 1, wherein the first external process is an applet running in conjunction with a virtual machine.

6. The method of claim 1, wherein the requested program is an object class definition.

7. The method of claim 1, wherein the library is a Java archive file.

8. The method of claim 1, wherein the library is local.

9. The method of claim 1, wherein the library is remote.

10. The method of claim 1, the instantiating further comprising:

creating, based on the attribute, a status method related to the interface object that indicates whether the requested program is designated to be accessible to the first external process.

11. The method of claim 10, the determining comprising:

executing the status method to determine whether the requested program is designated to be accessible to the first external process.

12. The method of claim 1, the sending comprising:

providing the requested program to the first external process based on a determination that the requested program is designated to be accessible to the first external process.

13. The method of claim 12, further comprising:

denying the first external process access to the requested program based on a determination that the requested program is not designated to be accessible to the first external process; and generating an error message when the requested program is not designated to be accessible to the first external process.

14. A method for limiting access to program files, comprising:

receiving, from a first external process, a request for a program file;

retrieving the requested program file from a library;

reading an attribute associated with the library and reflecting a list of program files designated as accessible to external processes;

instantiating an interface object that encapsulates the requested program file;

determining whether the requested program file is to be accessible to the first external process based on the attribute; and denying the first external process access to the requested program file based on the determination.

15. A method for limiting access to program files within an archive file, comprising:

retrieving a program file from the archive file;

reading an attribute associated with the archive file, the attribute including a list of program files designated as accessible to external processes;

creating an interface object that encapsulates the retrieved program file;

determining whether the retrieved program file is to be accessible to a first external process based on the attribute; and sending the retrieved program file to the first external process based on the determination.

16. A method for limiting access to programs, comprising:

sending a request for a program to a class loader, wherein the class loader is operable to retrieve the program from a library, read an attribute associated with the library and reflecting a list of programs designated as accessible to external processes, create an interface object that encapsulates the retrieved program, and determine whether the retrieved program is to be accessible based on the attribute; and receiving a response based on the determination.

17. The method of claim 16, further comprising: accessing the retrieved program based on the determination.

18. The method of claim 16, wherein the library is a shared library.

19. The method of claim 16, wherein the retrieved program is an object class definition.

20. The method of claim 16, wherein the library is a Java archive file.

21. The method of claim 16, wherein the library is local.

22. The method of claim 16, wherein the library is remote.

23. The method of claim 16, wherein the interface object reflects a status method that indicates whether the retrieved program is designated to be accessible.

24. The method of claim 23, wherein the class loader is further operable to execute the status method to determine whether the retrieved program is designated to be accessible.

25. The method of claim 16, further comprising:

receiving the retrieved program based on a determination that the retrieved program is designated to be accessible.

26. The method of claim 25, wherein the class loader is further operable to deny access to the retrieved program based on a determination that the retrieved program is not designated to be accessible, and generate an error message when the retrieved program is not designated to be accessible.

27. A data processing system for limiting access to program files, comprising:

a network; and a computer system connected to the network, the computer system comprising:

a virtual machine;

a library associated with a plurality of program files and an attribute reflecting a list of the plurality of program files designated as accessible to external processes; and a class loader operable to receive a request for a program file from the virtual machine, retrieve the program file from the library, read the attribute associated with the library, create an interface object that encapsulates the retrieved program file, determine whether the retrieved program file is to be accessible to the virtual machine based on the attribute, and send the retrieved program file to the virtual machine based on the determination.

28. An apparatus for limiting access to program files, comprising:
    means for receiving, from a first external process, a request for a program file;
    means for retrieving the requested program file from a library;
    means reading an attribute associated with the library and reflecting a list of program files designated as accessible to external processes;
    means for instantiating an interface object that encapsulates the requested program file;
    means for determining whether the requested program file is to be accessible to the first external process based on the attribute; and
    means for sending the requested program file to the first external process based on the determination.

29. The apparatus of claim 28, wherein the library is a shared library.

30. The apparatus of claim 28, wherein the first external process is an application program module.

31. The apparatus of claim 28, wherein the first external process is a multi-threaded application program module running in conjunction with an operating system.

32. The apparatus of claim 28, wherein the first external process is an applet running in conjunction with a virtual machine.

33. The apparatus of claim 28, wherein the requested program file is an object class definition.

34. The apparatus of claim 28, wherein the library is a Java archive file.

35. The apparatus of claim 28, wherein the library is local.

36. The apparatus of claim 28, wherein the library is remote.

37. The apparatus of claim 28, the instantiating further comprising:
    means for creating, based on the attribute, a status method related to the interface object that indicates whether the requested program is designated to be accessible to the first external process.

38. The apparatus of claim 37, the determining comprising:
    executing the status method to determine whether the requested program is designated to be accessible to the first external process.

39. The apparatus of claim 28, the sending comprising:
    means for providing the requested program file to the first external process based on a determination that the requested program file is designated to be accessible to the first external process.

40. The apparatus of claim 39, further comprising:
    means for denying the first external process access to the requested program file based on a determination that the requested program file is not designated to be accessible to the first external process; and
    means for generating an error message when the requested program file is not designated to be accessible to the first external process.

41. An apparatus for limiting access to program files within an archive file, comprising:
    means for retrieving a program file from the archive file;
    means for reading an attribute associated with the archive file, the attribute including a list of program files designated as accessible to external processes;
    means for creating an interface object that encapsulates the retrieved program file;
    means for determining whether the retrieved program file is to be accessible to a first external process based on the attribute; and
    means for sending the retrieved program file to the first external process based on the determination.

42. An apparatus for limiting access to program files, comprising:
    means for receiving, from a first external process, a request for a program file;
    means for retrieving the requested program file from a library;
    means for reading an attribute associated with the library and reflecting a list of program files designated as accessible to external processes;
    means for instantiating an interface object that encapsulates the requested program file;
    means for determining whether the requested program file is to be accessible to the first external process based on the attribute; and
    means for denying the first external process access to the requested program file based on the determination.

43. A computer-readable medium containing instructions for causing a computer to perform a method to limit access to program files, the method comprising:
    receiving, from a first external process, a request for a program file;
    retrieving the requested program file from a library;
    reading an attribute associated with the library and reflecting a list of program files designated as accessible to external processes;
    instantiating an interface object that encapsulates the requested program file;
    determining whether the requested program file is to be accessible to the first external process based on the attribute; and
    sending the requested program file to the first external process based on the determination.

44. The computer-readable medium of claim 43, wherein the library is a shared library.

45. The computer-readable medium of claim 43, wherein the first external process is an application program module.

46. The computer-readable medium of claim 43, wherein the first external process is a multi-threaded application program module running in conjunction with an operating system.

47. The computer-readable medium of claim 43, wherein the first external process is an applet running in conjunction with a virtual machine.

48. The computer-readable medium of claim 43, wherein the requested program file is an object class definition.

49. The computer-readable medium of claim 43, wherein the library is a Java archive file.

50. The computer-readable medium of claim 43, wherein the library is local.

51. The computer-readable medium of claim 43, wherein the library is remote.

52. The computer-readable medium of claim 43, the instantiating further comprising:
    creating, based on the attribute, a status method related to the interface object that indicates whether the requested program is designated to be accessible to the first external process.

53. The computer-readable medium of claim 52, the determining comprising:
executing the status method to determine whether the requested program is designated to be accessible to the first external process.

54. The computer-readable medium of claim 43, the sending comprising:
providing the requested program file to the first external process based on a determination that the requested program file is designated to be accessible to the first external process.

55. The computer-readable medium of claim 54, the method further comprising:
denying the first external process access to the requested program file based on a determination that the requested program file is not designated to be accessible to the first external process; and
generating an error message when the requested program file is not designated to be accessible to the first external process.

56. A computer-readable medium containing instructions for causing a computer to perform a method to limit access to program files, the method comprising:
receiving, from a first external process, a request for a program file;
retrieving the requested program file from a library;
reading an attribute associated with the library and reflecting a list of program files designated as accessible to external processes;
instantiating an interface object that encapsulates the requested program file;
determining whether the requested program file is to be accessible to the first external process based on the attribute; and
sending the requested program file to the first external process based on the determination.

57. A computer-readable medium containing instructions for causing a computer to perform a method to limit access to program files within an archive file, the method comprising:
retrieving a program file from the archive file;
reading an attribute associated with the archive file, the attribute including a list of program files designated as accessible to external processes;
creating an interface object that encapsulates the retrieved program file;
determining whether the retrieved program file is to be accessible to a first external process based on the attribute; and
sending the retrieved program file to the first external process based on the determination.

58. A computer-readable medium containing instructions for causing a computer to perform a method to limit access to program files, the method comprising:
sending a request for a program file to a class loader, wherein the class loader is operable to retrieve the program file from a library, read an attribute associated with the library and reflecting a list of program files designated as accessible to external processes, create an interface object that encapsulates the retrieved program file, and determine whether the retrieved program file is to be accessible based on the attribute; and
receiving a response based on the determination.

59. The computer-readable medium of claim 58, the method further comprising:
accessing the retrieved program file based on the determination.

60. The computer-readable medium of claim 58, wherein the library is a shared library.

61. The computer-readable medium of claim 58, wherein the retrieved program file is an object class definition.

62. The computer-readable medium of claim 58, wherein the library is a Java archive file.

63. The computer-readable medium of claim 58, wherein the library is local.

64. The computer-readable medium of claim 58, wherein the library is remote.

65. The computer-readable medium of claim 58, wherein the interface object reflects a status method that indicates whether the retrieved program file is designated to be accessible.

66. The computer-readable medium of claim 65, wherein the class loader is further operable to execute the status method to determine whether the retrieved program file is designated to be accessible.

67. The computer-readable medium of claim 58, the method further comprising:
receiving the retrieved program file based on a determination that the retrieved program file is designated to be accessible.

68. The computer-readable medium of claim 67, wherein the class loader is further operable to deny access to the retrieved program file based on a determination that the retrieved program is not designated to be accessible, and generate an error message when the retrieved program is not designated to be accessible.

* * * * *

UNITED STATES PATENT AND TRADEMARK OFFICE
CERTIFICATE OF CORRECTION

PATENT NO. : 6,996,707 B2
DATED : February 7, 2006
INVENTOR(S) : Sheng Liang et al.

It is certified that error appears in the above-identified patent and that said Letters Patent is hereby corrected as shown below:

Column 13,
Line 10, "means reading" should read -- means for reading --.

Signed and Sealed this

Fourth Day of April, 2006

JON W. DUDAS
*Director of the United States Patent and Trademark Office*